United States Patent
Neff et al.

[11] 3,921,963
[45] Nov. 25, 1975

[54] INJECTION MOLDING MACHINE CONSTRUCTION AND METHOD OF OPERATION

[75] Inventors: Engelbert Neff, Zollikon; Jakob Fehr, Mollis, both of Switzerland

[73] Assignee: Maschinenfabrik u. Giessuei Netstal AG, Switzerland

[22] Filed: Mar. 4, 1974

[21] Appl. No.: 445,463

[30] Foreign Application Priority Data
Mar. 9, 1973 Switzerland ............... 3476/73

[52] U.S. Cl. ............... 259/191
[51] Int. Cl.² ............... B29B 1/06
[58] Field of Search ........ 259/191, 192, 193, 9, 10, 259/5, 21, 40, 97; 425/208, 209; 100/145

[56] References Cited
UNITED STATES PATENTS
3,693,946  9/1972  Merritt ............... 259/191
3,797,808  3/1974  Peter ............... 259/191
3,822,057  7/1974  Wheeler ............... 259/191

*Primary Examiner*—Robert W. Jenkins
*Attorney, Agent, or Firm*—McGlew and Tuttle

[57] ABSTRACT

An injection molding machine comprises an injection cylinder having a discharge spaced from an inlet and a fluid pressure operated plasticizing and injection screw which is axially movable and rotatable in said cylinder. Means are provided to measure the distance of axial displacement of the screw, the rotational speed of the screw and the fluid pressure necessary for displacing the screw and these are connected to a programmable device. The injection molding machine is operated by using the programmable device to simultaneously control the rotational speed of the screw and the fluid pressure required for moving the screw as a function of the travel distance of the screw during the plasticizing and dosing operation.

5 Claims, 2 Drawing Figures

INJECTION MOLDING MACHINE CONSTRUCTION AND METHOD OF OPERATION

BACKGROUND OF THE INVENTION

1. Field of the Invention

This invention relates in general to the construction of an injection molding machine and to a method of operating such machine and in particular to a new and useful injection molding machine having a programmable device for regulating the pressure for advance movement of the screw and the motor for driving the screw in rotational movement as a function of the distance that the screw has already moved during the plasticizing operation.

2. Description of the Prior Art

At the present time plasticizing and injection machines are usually operated at a constant rotational speed and are advanced under constant dynamic pressure. The rotatable plasticizing screw is moved axially against the dynamic pressure of the plasticized molding material and it displaces it toward the nozzle part or discharge until the rotational drive is stopped. In such a conventional process it is advantageous that the energy supplied mechanically by means of the screw or by the frictional heat produced in the molding material and depending on the predetermined rotational speed and dynamic pressure can be controlled as a mean value by reference to the movement of the screw or the dosage distance. The accuracy of the dosage is thereby affected because as the rotational movement of the screw is stopped by the actuation of a dosage limit switch, the speed of the screw drops to zero only with delay, due to the inertia phenomenon. This results in a casual overtraveling of the limit switch depending on the consistency of the material, the oil temperature in the hydraulic system, the previous speed, and the effective dynamic pressure. The irregularities in the dosage are also caused by unequal pressures built up along the screw during the plasticizing or dosing. As the screw is stopped the overpressures are absorbed by the material which moves toward the discharge and by the screw traveling beyond the dosage limit switch.

There are known devices in which the frictional heat of the molding material is controlled by varying the dynamic pressure as a function of the movement of the screw in plasticizing or dosing. Such measures however contribute but partly to the elimination of the difficulties. A variation of the dynamic pressure produces its effect both on the rotational and the return speed of the screw. Thus at a constant rotational speed the frictional heat and the dosing speed and consequently the amount of time that the material remains in the heating cylinder are not controllable by the dynamic pressure independently of each other. In addition the shortcomings of an inaccurate dosage cannot thereby be remedied.

SUMMARY OF THE INVENTION

The invention provides a programmable device in order to avoid the drawbacks of the prior art, by which the rotational speed of the screw and the dynamic pressures are simultaneously controlled as a function of the return position of the screw. Because of the simultaneous control the rotational speed and the dynamic pressure are detached from each other so that their values can be varied independently. By an appropriate programming it is possible to keep the dynamic pressure and the rotational speed at the end of the screw return at such a low level (equalize pressure distribution over the screw at a correspondingly lower rotational speed) that an overtraveling of the switch associated, for example, with the end of the dosage distance, is practically impossible. Along with this control, a possibility is provided by the combined programming of speed and dynamic pressure to predetermine the homogeneity and the sojourn time of the material in the heating cylinder with a high degree of reproducability to obtain a regular and accurate dosage.

For selecting the program or for the programming itself, it has been found best to use an electronic device for a programming operation. Various well known programming and storage possibilities are possible, for example cross-bar distributors, digital cam switches, semiconductor storages, or core memories with a central keyboard data input. For purposes of an automatic programming through data input equipment such as punched tape readers, etc., the most suitable component parts are semiconductor storages and core memories. The conventional design of central data input arrangements would be disadvantages insofar as the different values have to be addressed through a multidigit figure and in general particularly with core memories the stored values are centrally displayed only upon interrogation. This renunciation of a simultaneous display of the programmed values would considerably affect the operational convenience.

Aside from an arrangement with digital cam switches including a simultaneous display but not automatically programmable, there may be used a storage organization permitting a data input through a central keyboard where the different values are simultaneously displayed by luminous numerals. A special switching logic may be provided permitting a non-central direct addressing through an impulse key or by magnetically actuating a reed relay provided at the respective display. Thus a simple passing over of the storage is possibe any time through the keyboard. It is also possible in addition to the non-central addressing and simultaneous display to make use of the advantageous automatic data input and output through punched or magnetic tapes, etc.

Accordingly it is an object of the invention to provide an injection molding machine which comprises an injection cylinder having a discharge with a fluid pressure operated plasticizing and injection screw axially and rotatably movable in said cylinder by a fluid pressure motor such as a movable piston and a programmable device having means for simultaneously controlling the rotational speed of the screw and the fluid pressure as a function of the return travel distance of the screw during the plasticizing and dosing operation.

A further object of the invention is to provide a method of operating an injection molding machine which comprises using a program device to control the rotational speed of the rotatable plasticizing and injection screw and the fluid pressure for advancing the screw as a function of the travel distance of the screw during plasiticizing and dosing.

A further object of the invention is to provide an injection molding machine which is simple in design, rugged in construction and economical to manufacture.

For an understanding of the principles of the invention reference is made to the following description of a typical embodiment thereof as illustrated in the accompanying drawings.

GENERAL DESCRIPTION OF THE PREFERRED EMBODIMENT

Figure 1:
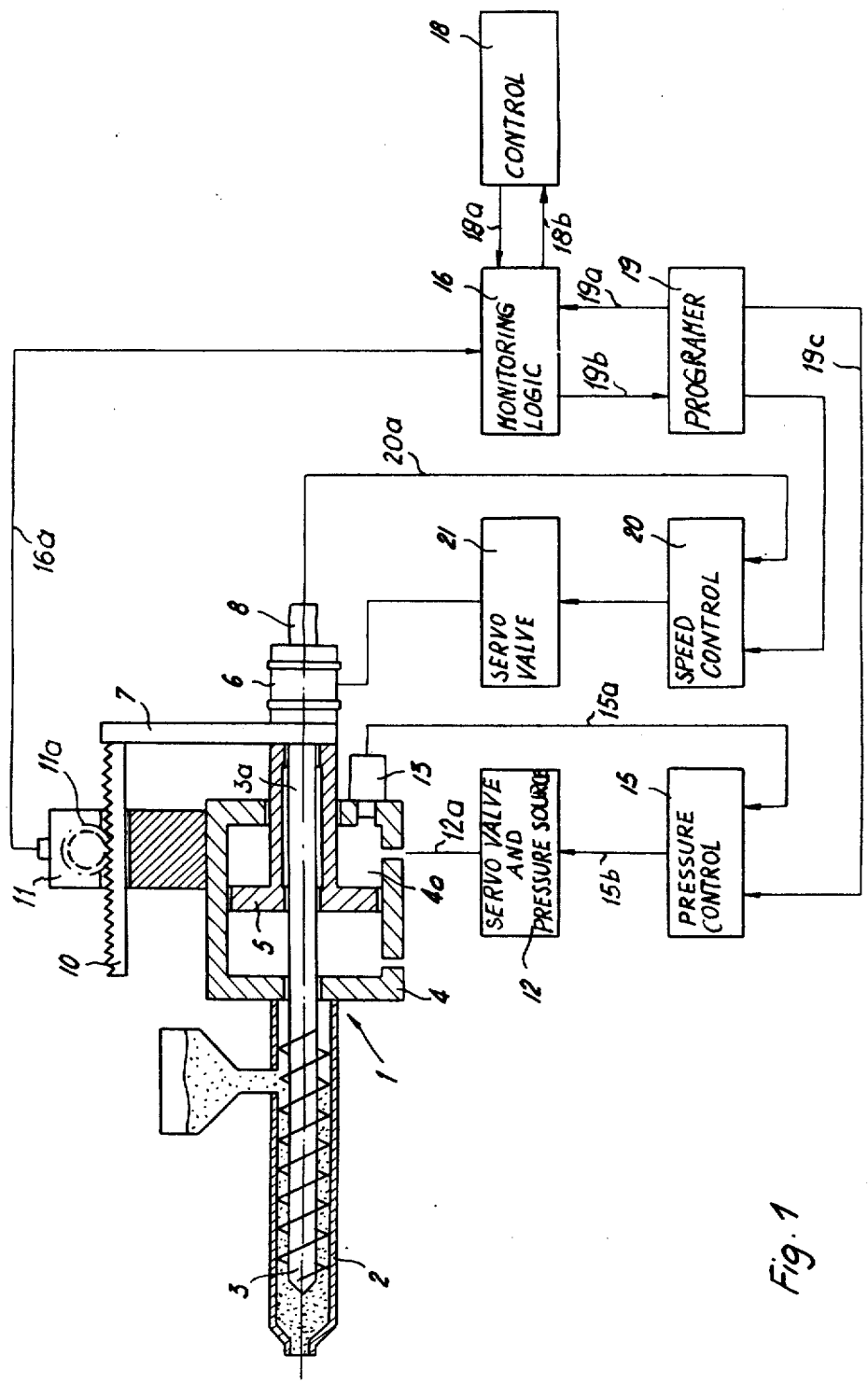
FIG. 1 is a schematic axial sectional view of a pasticizing and injection machine constructed in accordance with the invention.

Referring to the drawings in particular in FIG. 1 the invention includes a plasticizing and injection unit generaly designated 1 which comprises a rotatable and axially movable plasticizing and injection screw 3 which is arranged within a heating cylinder 2. The rear end portion 3a of through a wall of a fluid pressure cylinder 4 which is connected to the rear end of the cylinder 2. An injection piston 5 is coupled to the rear end 3a and it is easily displaceable within the pressure cylinder 4. The rear end 3a of the screw 3 is connected to a driving motor 6 to effect the rotation thereof. A plate 7 which is axially displaceable with the screw 3 but is anchored against rotation is connected to a rack 10 which engages with a gear 11a of a distance meter 11. The distance meter 11 is of a type which furnishes electrical signals corresponding to the amount of distance the plate 7 and hence the screw 3 moves during the plasticizing and injection operation.

In accordance with a feature of the invention a pressure gauge 13 is mounted on a pressure chamber 4a of the pressure cylinder 4 and it is connected through a servo valve and pressure source generally shown by the diagram 12 for the purpose of supplying a fluid pressure to the cylinder to actuate the piston 5 for controlling the advance movement of the screw 3. The pressure gauge 13 is of a type which is capable of delivering an electrical signal corresponding to the hydraulic pressure in the pressure chamber 4a.

In accordance with another feature of the invention a tachometer 8 for measuring the speed of rotation of the screw 3 is connected to the hydraulic driving motor 6 and it is of a type which is capable of furnishing an electrical actual valve signal corresponding to the rotational speed. The tachometer 8 is connected through a connection 20a to a speed regulator 20 which is connected to a servo valve mechanism 21 for regulating the speed of the hydraulic motor 6. The pressure gauge 13 is connected through a connecting line 15a to a pressure control 15 which actuates the servo valve mechanism 12. The signal from the distance meter 11 is passed through a connecting line 16a to a monitoring logic 16. The logic 16 coordinates the plasticizing and the dosing operation with the control commands of the usual control 18 of the machine and selects the set value of the program unit 19 which is connected thereto through connection and return lines 19a and 19b, respectively. The control 18 is connected to the monitoring logic through connecting and return lines 18a and 18b, respectively. The set value of the program unit 19 corresponds to the respective distance which is indicated by the distance meter 11.

The correspondingly set value of the rotational speed of the motor 6 is furnished to a speed regulator 20 which maintains the actual and the set value of the speed in accordance with the setting of the servo valve 21. This makes it possible to perform a preselected distance-dependant speed program for the plasticizing and dosing operation. The pressure gauge 13 measures the dynamic pressure of the fluid such as oil which during the dosing operation is directed through a connecting line 12a into the space 4a behind the injection piston 5. The pressure gauge 13 furnishes an electrical signal which is directed to the dynamic pressure control 15 as the actual value. The programmer 19 is also connected to the speed control through a connection line 19c and the pressure control 15 is connected to the serve valve and pressure source 12 through a connecting line 15b. The arrangement makes it possibe to perform a preselected distance-dependant speed program for the plasticizing an dosing operation.

The screw position is determined by the distance meter 11 in the corresponding part of the program is started in the unit 19 through the monitoring logic 16. The program unit 19 delivers the set value of the dynamic pressure corresponding to the respective distance through the dynamic pressure control 15. The control 15 keeps the actual and the set values of the dynamic pressure in accordance with the programmed arrangement and the values sent from the pressure gauge 13. The device makes it possible to perform distant dependant dynamic pressure programs which are independent of the rotational speed. The program unit 19 permits the selection of different distance sections and the corresponding set values of the rotational speed and the dynamic pressure.

Figure 2:
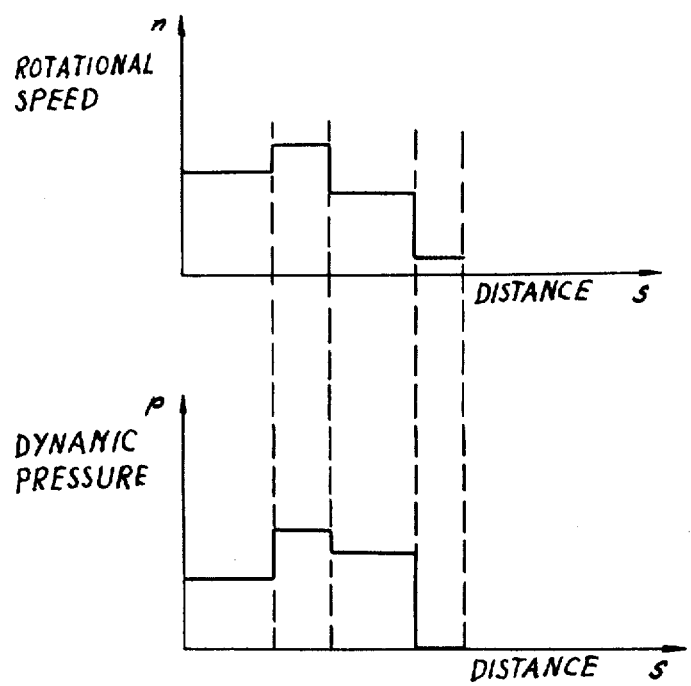
FIG. 2 is a control diagram for the rotational speed of the screw and the dynamic pressure.

As shown in FIG. 2 four identical distance sections are selected for presetting the values of both rotational speed and dynamic pressure. FIG. 2 shows a typical program sequence at the dosage end. In the last distance section the dosage is effected with a lowered dynamic pressure and at a rotational speed n whereby a casual overtraveling of the dosage limit switch is avoided.

While specific embodiment of the invention has been shown and described in detail to illustrate the application of the principles of the invention, it will be understood that the invention may be embodied otherwise without departing from such principles.

What is claimed is:

1. An injection molding machine comprising an injection cylinder having a discharge, a fluid pressure operated plasticizing injection screw axially movable and rotatable in said cylinder, fluid pressure operated means for advancing said screw, means connected to said screw to rotate said screw, pressure sensing means for sensing the pressure of said fluid pressure means during the advancing movement of said screw, distance sensing means connected to said screw for sensing the movement distance of said screw, feed sensing means connected to said screw for sensing the rotational speed of said screw, and a programmable device connected to each of said pressure sensing means, said distance sensing means and said rotational speed sensing means and simultaneously controlling the rotational speed of said screw and said fluid pressure above the operating pressure as a function of the screw travel distance during the plasticizing and dosing operation.

2. An injection molding machine according to claim 1 wherein said fluid pressure means includes a fluid pressure source and a servo valve connected to said fluid pressure source for regulating the supply thereof, a fluid pressure cylinder having a piston movable therein connected to said plasticizing screw and connected to said servo valve for receiving fluid pressure therefrom to move said screw, a speed control connected to said servo valve and to said pressure sensing means, said means to rotate said screw comprising a hydraulic motor, and servo valve means connected to said motor for varying the fluid presssure to said motor for regulating the speed thereto and a motor speed regulator connected to said servo valve for operating ssid valve.

3. An injection molding machine according to claim 1 including a distance meter including a rotatable gear member, a plate connected to said screw and being movable therewith and having a rack engaged with said rotatsble gear member and being movable with said plate in accordance with the distance of movement of said screw to rotate said gear member, said rotatable gear member providing an indication of the distance of movement of said screw through said distance sensing means.

4. An injection molding machine particularly for plastics, comprising an injection cylinder having an injection discharge and an inlet for material to be plasticized spaced therefrom, an injector screw rotatable in said cylinder, rotation means to rotate said injector screw, a pressure cylinder, a piston connected to said screw and being movable in said cylinder to advance said screw, pressure means for supplying fluid pressure to said pressure cylinder to advance said piston, pressure measuring sensor means for measuring the pressure in said cylinder to advance said piston connected to said cylinder, velocity measuring sensor means connected to said screw for measuring the rotational velocity thereof, distance measuring sensor means connected to said screw for measuring the distance moved by said screw during plasticizing and injection, and a program control unit connected to said pressure means for controlling the fluid pressure of said pressure cylinder and to said rotation means for controlling the rotational speed of said screw and also connected to each of said pressure measuring sensor means, said velocity measuring sensor means and said distance measuring sensor means for controlling the rotational speed of the screw and the fluid pressure to move said screw as a function of the return travel distance of the screw during plasticizing and dosing operation.

5. Method of operating an injection molding machine for molding plastics which includes an injection screw rotatable and axially displaceably mounted in an injection cylinder having a discharge, means for rotating said injector screw and a pressure piston connected to said screw and being movable by hydraulic pressure to displace said screw, comprising supplying a pressure to said piston to displace said screw during the injection process and continuously measuring the pressure applied to the screw, rotating the screw and measuring the velocity of rotation of the screw, measuring the distance of axial displacement of said screw continuously, and controlling the rotational speed of the screw and the fluid pressure to move said screw in accordance with the amount of distance of movement of the screw.

* * * * *

UNITED STATES PATENT OFFICE
CERTIFICATE OF CORRECTION

Patent No. 3,921,963   Dated November 25, 1975

Inventor(s) Engelbert Neff et al.

It is certified that error appears in the above-identified patent and that said Letters Patent are hereby corrected as shown below:

On the Title Page, Item [73] should read

----- Maschinenfabrik und Giesserei Netstal AG ----.

Signed and Sealed this

Twenty-ninth Day of March 1977

[SEAL]

Attest:

RUTH C. MASON
Attesting Officer

C. MARSHALL DANN
Commissioner of Patents and Trademarks